United States Patent
Samy

(10) Patent No.: US 8,619,844 B2
(45) Date of Patent: Dec. 31, 2013

(54) METHOD FOR REDUCING INTERFERENCES BETWEEN A FIRST CARRIER CURRENT SIGNAL TRANSMITTED BETWEEN MODEMS OF A POWER GRID AND A SECOND SIGNAL TRANSMITTED BETWEEN MODEMS OF ANOTHER GRID

(75) Inventor: Roger Samy, Rueil Malmaison (FR)

(73) Assignee: Sagemcom Broadband SAS, Rueil Malmaison (FR)

( * ) Notice: Subject to any disclaimer, the term of this patent is extended or adjusted under 35 U.S.C. 154(b) by 61 days.

(21) Appl. No.: 13/496,932

(22) PCT Filed: Aug. 27, 2010

(86) PCT No.: PCT/EP2010/062583
§ 371 (c)(1),
(2), (4) Date: Mar. 19, 2012

(87) PCT Pub. No.: WO2011/036026
PCT Pub. Date: Mar. 31, 2011

(65) Prior Publication Data
US 2012/0177093 A1 Jul. 12, 2012

(30) Foreign Application Priority Data
Sep. 25, 2009 (FR) ..................... 09 56639

(51) Int. Cl.
*H04B 1/38* (2006.01)
(52) U.S. Cl.
USPC .......... 375/222; 375/221; 375/220; 375/219; 725/111; 455/402; 370/431; 370/482
(58) Field of Classification Search
USPC ................. 375/222, 221, 220, 219; 725/111; 455/402; 370/431, 482
See application file for complete search history.

(56) References Cited

U.S. PATENT DOCUMENTS

2006/0114925 A1 6/2006 Gerszberg et al.
2011/0116555 A1* 5/2011 Schwager et al. ............ 375/257

FOREIGN PATENT DOCUMENTS

EP 1 643 658 4/2006
EP 1 830 535 9/2007

OTHER PUBLICATIONS

International Preliminary Report in English, dated Apr. 12, 2012, for PCT/EP2010/062583.
Kee Bong Song et al., "Dynamic Spectrum Management for Next-Generation DSL Systems", *IEEE Communications Magazine*, vol. 40, No. 10, Oct. 1, 2002, pp. 101-109.

(Continued)

*Primary Examiner* — Zewdu Kassa
(74) *Attorney, Agent, or Firm* — Nixon & Vanderhye, PC

(57) ABSTRACT

A method and device for reducing interference between a first signal of the carrier current type (Se) transmitted between modems ($M_{CPL}$) in an electrical network (Re) and a second signal (S) transmitted between modems (M) in another network (R), the signals (Se, S) being coded by distribution of the data over allocated carrier frequencies in the same reserved frequency band (BF). The method includes:

Figure 1:
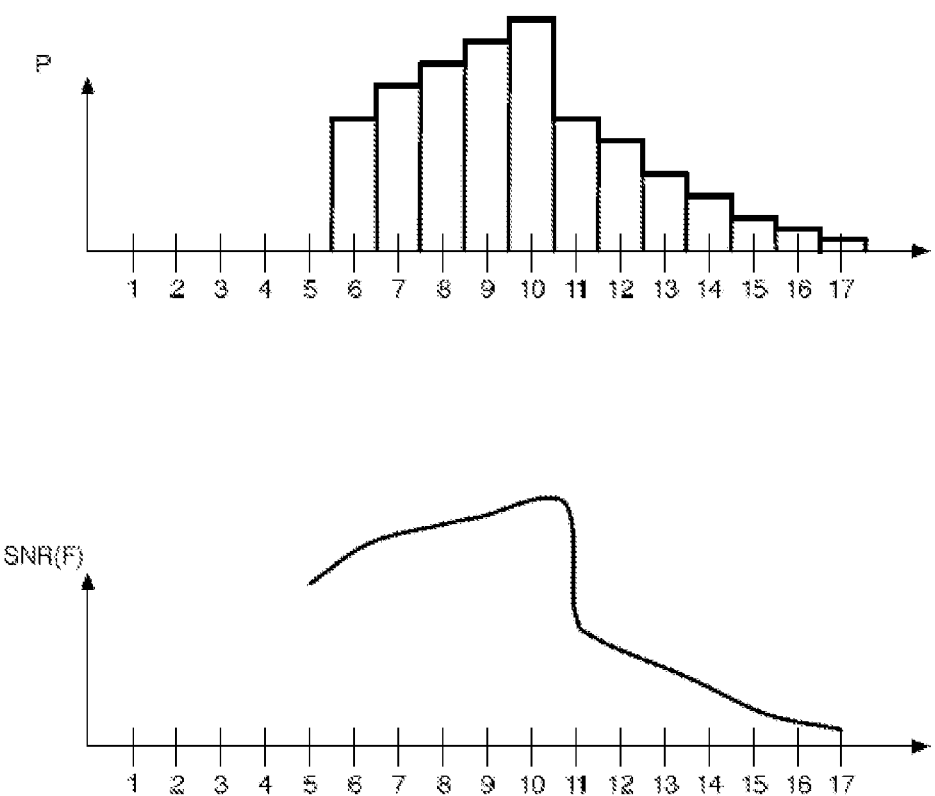

a step of measurement, by each modem ($M_{CPL}$) in the electrical network, of transmission characteristics of each carrier frequency (F) that may be used for coding the first signal (Se), a step of detection, by analysis of the measured transmission characteristics, of at least one second, carrier frequency ($F_{2,n}$), which is allocated or may be allocated for coding the second signal (S) and is common with at least one first carrier frequency ($F_{1,m}$), which is allocated for coding the first signal (Se), and a steps of optimisation of the distribution of the data of the first signal (Se) over carrier frequencies.

15 Claims, 4 Drawing Sheets

(56) References Cited

OTHER PUBLICATIONS

Morosi et al., "A rate adaptive bit-loading algorithm for a DMT modulation system for in-building power-line communcations", *Global Telecommunications Conference*, vol. 1, Nov. 28, 2005, pp. 403-407.

Alastair et al., "An optimal multi-user, multi-service algorithm for Dynamic Spectrum Management in DSL", *Telecommunications*, Jun. 16, 2008, pp. 1-5.

Yu et al., "Distributed Multiuser Power Control for Digital Subscriber Lines", *IEEE Journal on Selected Areas In Communications*, vol. 20, No. 5, Jun. 1, 2002.

Yu et al., "An Adaptive Multiuser Power Control Algorithm for VSDL", *Institute of Electrical and Electronic Engineers*, vol. 1, Nov. 25, 2001, pp. 394-398.

Papandriopoulos et al., "Scale: A Low-Complexity Distributed Protocol for Spectrum Balancing in Multiuser DSL Networks", *IEEE Transactions on Information Theory*, vol. 55, No. 8, Aug. 1, 2009, pp. 3711-3724.

Cendrillon et al., "Iterative spectrum balancing for digital subscriber lines", *Communications*, vol. 3, May 16, 2005, pp. 1937-1941.

\* cited by examiner

METHOD FOR REDUCING INTERFERENCES BETWEEN A FIRST CARRIER CURRENT SIGNAL TRANSMITTED BETWEEN MODEMS OF A POWER GRID AND A SECOND SIGNAL TRANSMITTED BETWEEN MODEMS OF ANOTHER GRID

This application is the U.S. national phase of International Application No. PCT/EP2010/062583 filed 27 Aug. 2010 which designated the U.S. and claims priority to FR Patent Application No. 09/56639 filed Sep. 25, 2009, the entire contents of each of which are hereby incorporated by reference.

The present invention concerns a method and device for reducing interference between a first carrier current signal transmitted between modems in an electrical network and a second signal transmitted between modems in another network.

It is known that digital services, such as internet access, internet telephony or high-definition television, which are often grouped together by the operators in a so-called triple-play offer, can be distributed at the subscribers through several domestic networks.

For this purpose, a domestic gateway is installed at the subscriber in order to exchange the data of these services with equipment in the network external to the domestic installation. The carrier signals for these data are then transmitted locally between modems, the type of which depends on the transmission technology (standard) that is used.

Historically, ADSL (Asymmetric Digital Subscriber Line) technology was the first to be used but the present invention relates to the case of high-rate communication technologies that may be of the DSL type, that is to say for example VDSL (Very high bit rate DSL) or VDSL2 (ITU G.993.2), or in accordance with the G.hm DSL mode recommendation (ITU G. 9960) or be of the carrier current type, that is to say in accordance for example with the HomePlug AV standard (HomePlug PowerLine Alliance, "HomePlug AV Baseline Specification", Version 1.0.00, December 2005), or the G.hn carrier current mode recommendation, or be based on the technology developed by the companies UPA/OPERA or Panasonic.

This high-rate communication technology groups together a set of signal processing operations so that data are transmitted between two modems, one transmitting and the other receiving.

On the transmitter side, the data to be transmitted are normally coded according to an error correcting code of the FEC type (Forward Error Code), and then the codes obtained are matched with a symbol of a constellation of a modulation of the QAM (Quadrature Amplitude Modulation) or PSK (Phase Shift Keying) type. The length of these symbols, hereinafter referred to as QAM symbols, depends on the dimension of the constellation of the modulation adopted: 4QAM, 16QAM, . . . , BPSK (Binary Phase Shift Keying). The bits of each QAM symbol are then distributed over allocated so-called carrier frequencies according to the technique known as OFDM (Orthogonal Frequency Division Multiplexing). The carrier frequencies are orthogonal with each other and are distributed in a reserved frequency band according to a pre-defined frequency plan. Some high-rate technologies define several frequency plans capable of being used for distributing the carrier frequencies.

The reserved frequency band varies according to the high-rate technology. It may extend for example from 2 to 30 MHz for the VDSL2 standard or from 1 to 100 MHz for the ITU G.hn recommendation.

The OFDM symbols thus obtained are then transmitted over a transmission channel of the network. It should be noted that the transmission characteristics of a transmission channel fluctuate over time according among other things to the change in the environment thereof.

On the receiver side, OFDM symbols are received and the data are then obtained by demodulation of the QAM symbols according to the constellation used at the transmitter and following a decoding of the error correcting code.

The use of a high-rate technology of the carrier current type for distributing high-rate stream on a domestic electrical network is widely recognised today as being an advantageous technology because, among other things, it uses an existing distribution network at the subscriber and the transmission capacity on this type of transmission channel, that is to say the transmission rate on this channel, is high.

However, it has been observed that, when a technology of the carrier current type was used on a local electrical network and another high-rate technology, of the DSL type or carrier current type, was used on anther local network, interference occurred between the carrier current signals transmitted over the electrical network and the signals transmitted by this other network.

This interference occurs when a line in the electrical network is situated close to a line in this other network. This is because, as these high-rate technologies use at least partially the same reserved frequency band, and the same data coding method by distribution over carrier frequencies, in this case OFDM, when a line in the electrical network is situated in the vicinity of a line in this other network, the transmission performance of the transmission channel of each of the two networks degrades, causing in particular losses of transmission rate on these two networks.

This interference is amplified when the modems in the two local networks are supplied by the same electrical source since, in this case, coupling by conduction between the modems occurs.

The use of the electrical network and another network for distributing the services of a triple-play offer therefore poses the problem of interference between a carrier current signal that is transmitted between modems on an electrical network and a signal that is transmitted on another network, which may be either of the DSL type or an electrical network possibly distinct from the first.

A method, referred to as bit loading, is known for coding the data of a DSL signal by distribution on carrier frequencies from the estimated transmission characteristics of a transmission channel of a line in the DSL network.

More precisely, this iterative method consists, at each iteration, of optimising the transmission rate of the transmission channel on the line and the transmission power level of the signal transmitted on this channel, considering the interference on the other lines in this network as noise and subject to a given spectral density profile.

Two approaches are generally used for implementing such a method.

According to the first, the transmission rate of the transmission channel of a line in the DSL network is maximised subject to the maximum transmission power of each carrier frequency complying with the given spectral density profile.

According to the second approach, the transmission power level of each carrier frequency is minimised subject to the constraint of a transmission rate of the transmission channel of a fixed line. For more details on these two approaches, reference can be made to the article "Dynamic Spectrum Management for Next-Generation DSL Systems", K. Song et al., IEEE Communications Magazine, October 2002.

FIG. 1 shows timing diagrams illustrating an example result of distribution of data of a signal on carrier frequencies from an estimated signal to noise ratio SNR(F) of a transmission channel. The timing diagram at the top shows the transmission power spectral density P of the signal as a function of the carrier frequencies, which are here referenced 6 to 17. A rectangle centred on each carrier frequency represents the width of the frequency band around each carrier frequency. The timing diagram at the bottom shows an example of an estimated signal to noise ratio SNR(F) on the transmission channel.

According to this example, the signal to noise ratio SNR(F) is very high, in particular for carrier frequencies 9 and 10, which then carry a large part of the signal. It is very low in particular for the carrier frequencies 14 to 17, which then carry a relatively weak part of the signal.

The method for coding the data of a DSL signal therefore reduces the interference between the signals transmitted between two lines in a DSL network. However, this method requires the signals to be synchronised in time according to the same time base. This method is therefore not suitable for reducing interference between signals transmitted on two networks that have no common time base, such as for example two distinct electrical networks or one electrical network and a DSL network.

The current version of the G.hn recommendation defines specifications that must be complied with by the high rate technology modems that will shortly be used for distributing triple-play services at a subscriber, whether this distribution be carried out on telephone metal pairs, on coaxial cables or on electrical power lines so that the signals transmitted on these various media interfere with each other as little as possible.

In a network of the carrier current type, for example of the G.hn carrier current mode type, one of the modems, referred to as the master modem, fulfils a special role among the other modems in the same transmission medium. This master modem acts as a kind of network head by storing the events relating to the other modems, referred to as slaves, and, in addition, implementing a method for coding the data of a signal of the carrier current type by distribution over carrier frequencies using transmission characteristics of a transmission channel of the electrical network relating to a slave modem. This method uses a statistical sharing of the frequency or time resources and a mechanism, known as power back-off, that consists of reducing as far as possible the transmission power level as a function of the data rates to be transmitted. Consequently the carrier frequencies and the power levels thereof are determined independently of the transmission characteristics of the transmission channel, which change over time.

Thus such a method does not take into account the interference due to a line in another network that might arise during signal transmission.

This recommendation defines, among other things, the physical layer of these modems, the maximum spectral density profiles and the reserved frequency band from which the carrier frequencies are chosen. According to the current version of this recommendation, the reserved frequency band extends from 1 Hz to 100 MHz, the occupation of the carrier frequencies, 3960 in number, is 25 kHz and the transmission power density is −50 dBm/Hz. In addition, this recommendation recommends that the MAC layer of a modem, the layer at a higher level than the physical layer according to the OSI model, functions according to a mode that is synchronised with respect to the alternating electrical current frequency delivered by the electrical network. Subsequently, this type of operating mode will be referred as an MAC mode.

In addition, a contribution to this recommendation (ITU Document 09AG-061, Study Group 15, Atlanta, Ga., 20 Feb. 2009) describes that, during an MAC cycle, a modem measures the transmission rate on the transmission channel, the signal to noise ratio and the background noise for each carrier frequency allocated.

However, this contribution does not state how these measurements can be used for reducing the interference between a carrier current signal and a signal transmitted on another network.

The inventor observed that the coupling effect between an electrical network and another network was essentially due to the high transmission power levels of certain carrier frequencies used for the transmission of OFDM symbols on the electrical network. In addition it was observed that, despite the fact that the frequency plans of the DSL and carrier current technologies are different, the carrier frequencies of these frequency plans that interfere with each other usually had common values, that is to say either identical or similar values.

The problem solved by the present invention is therefore determining a method of producing interference between a first signal of the carrier current type transmitted between modems on an electrical network and a second signal transmitted on another network, of the DSL or carrier current type, the said signals being coded by distribution of the data over allocated carrier frequencies in the same reserved frequency band.

To this end, the method comprises a step of measurement, by each modem in the electrical network, of transmission characteristics of each carrier frequency that may be used for coding the first signal, a step of detecting, by analysing the transmission characteristics measured, at least one carrier frequency, referred to as the second carrier frequency, which is allocated or may be allocated for coding the second signal and is common with at least one carrier frequency, referred to as the first carrier frequency, which is allocated for coding the first signal, and the measured transmission characteristics of which are degraded with respect to those of a previous measurement, and a step of optimising the distribution of the data of the first signal on carrier frequencies so as to minimise the transmission power level of the first carrier frequencies that are common with the second carrier frequencies thus detected while optimising the transmission rate of the first signal.

Thus, from measurements of transmission characteristics of the carrier frequencies liable to be used for coding the carrier current signal, it is determined whether these carrier frequencies interfere with carrier frequencies of the second DSL or carrier current signal. It is then determined what these carrier frequencies are precisely by comparing them with the carrier frequencies that may be used for coding the second signal. The optimisation step then makes it possible to distribute priority-wise the data of the first signal on carrier frequencies other than those that have just been thus detected.

The present invention also concerns a modem designed to implement such a method and a system distributing high-rate services comprising at least one modem.

Figure 2:
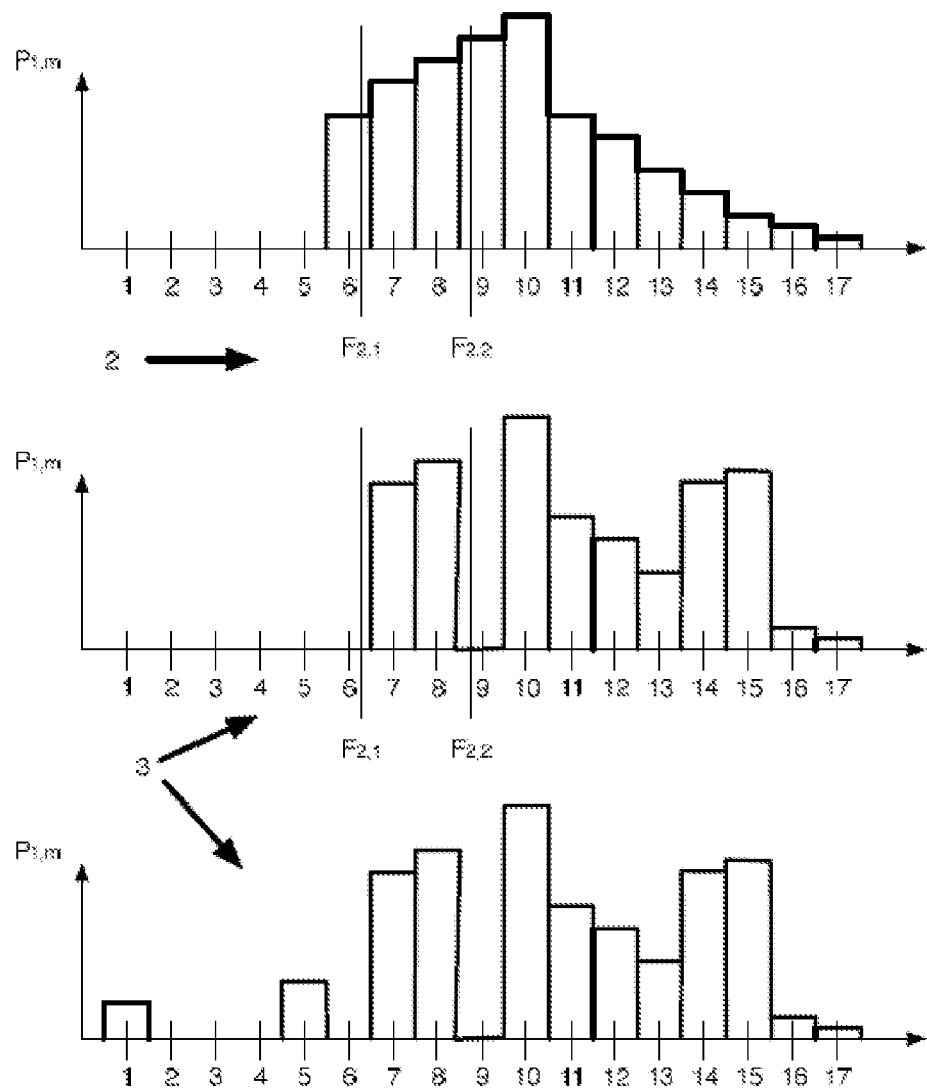
Figure 3:
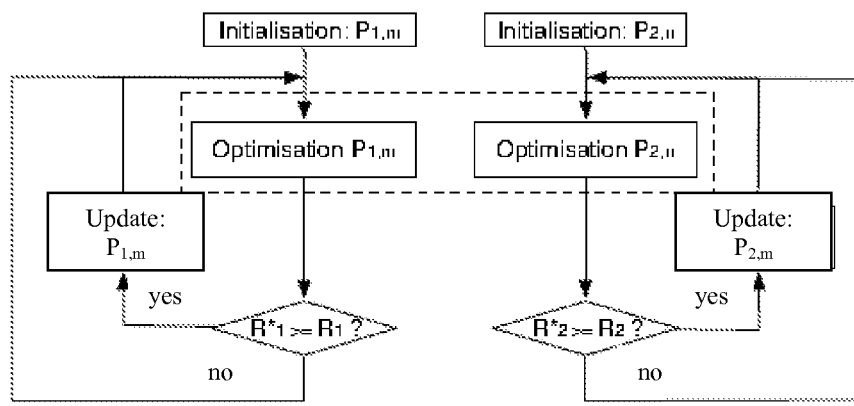
Figure 4:
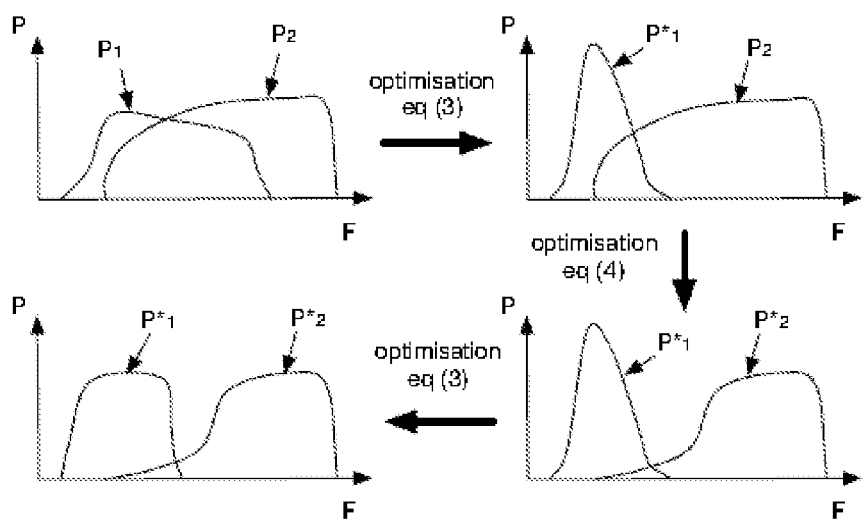
Figure 5:
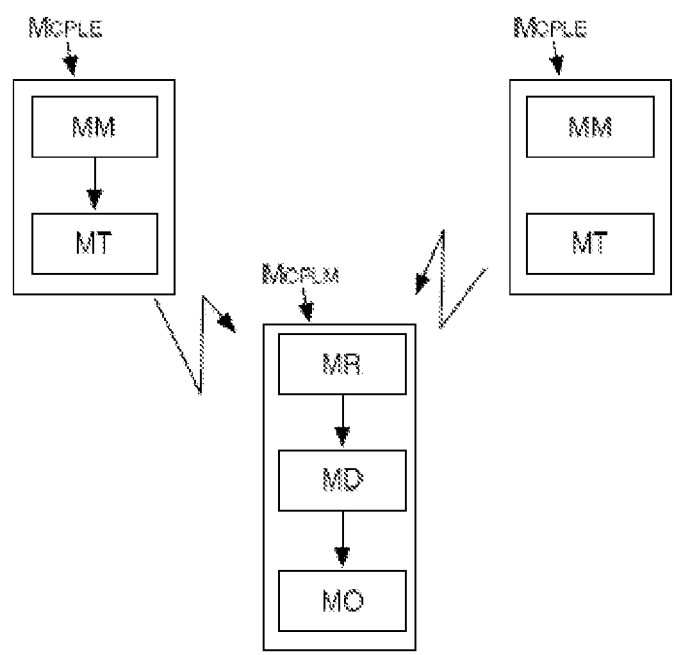

The features of the invention mentioned above, as well as others, will emerge more clearly from a reading of the following description of an example embodiment, the said description being given in relation to the accompanying drawings, among which:

FIG. 1 shows timing diagrams illustrating an example result of the distribution of data on carrier frequencies using an estimated signal to noise ratio of a transmission channel, FIG. 2 shows an illustration of a first embodiment of the method, FIG. 3 shows a diagram of an iterative algorithm that allows competitive optimisation of the distribution of the data of signals Se and S on the carrier frequencies thereof, FIG. 4 shows an illustration of two iterations of this algorithm for distributing the data of the signals Se and S competitively, and FIG. 5 shows an embodiment of this device in the case of an electrical network comprising at least one slave modem and one master modem.

In general terms, the present invention concerns a method of reducing interference between a carrier current signal Se transmitted between modems $M_{CPL}$ in an electrical network Re and a signal S transmitted between modems M in another network R.

The signals Se and S are coded by the distribution of data on allocated carrier frequencies that all belong to the same reserved frequency band BF as described in the introductory part. The M carrier frequencies allocated for coding the signal Se are denoted $F_{1,m}$ (m=1 to M).

The method also comprises a step 1 of measurement, by each modem $M_{CPL}$ in the electrical network Re, of the transmission characteristics of each carrier frequency F that may be used for coding the signal Se, a step 2 of detection, by analysing the transmission characteristics measured, of at least one carrier frequency $F_{2,n}$ that is allocated or may be allocated for coding the signal S and is common with at least one carrier frequency $F_{1,m}$ that is allocated for coding the signal Se and the measured transmission characteristics of which are degraded with respect to those of a previous measurement, and step 3 of optimisation of the distribution of the data of the signal Se on carrier frequencies so as to minimise the transmission power level of the carrier frequencies $F_{1,m}$ that are common with the carrier frequencies $F_{2,n}$ thus detected while optimising the transmission rate of the signal Se.

During step 2, the transmission characteristics can be based on a spacing property that may be either fixed, such as equal to the separation between carrier frequencies of the VDSL2 type (4 kHz or 8 kHz), or variable according to the channel, which may be of the carrier current (PTL), coaxial or telephone type and/or according to the profiles of these channels. This makes it possible to be free of the noise present in the transmission band during measurements of the transmission characteristics.

According to one implementation of the method, step 1 is implemented for each slave modem in the electrical network and step 2 is implemented for a master modem.

According to this implementation, during step 1, each slave modem $M_{CPL}$ measures transmission characteristics on each carrier frequency F in the reserved frequency band BF.

Preferably, the transmission characteristics measured on a carrier frequency F are the spectral density level P of this carrier frequency, the gain $|H|^2$ and the variance $\sigma^2$ of the complex transmission channel relating to this carrier frequency and the transmission rate $R_1$ of the signal Se.

The measurements made by each slave modem are then transmitted to the master modem.

During step 2, the master modem detects whether at least one carrier frequency $F_{2,n}$ is common with a carrier frequency $F_{1,m}$ the measured transmission frequencies of which are degraded with respect to those of a previous measurement.

For this purpose, the master modem analyses the transmission characteristics $P_{1,m}$, $|H_{1,m}|^2$ and $\sigma_{1,m}^2$ of each carrier frequency $F_{1,m}$ and the rate $R_1$ that it has received from each slave modem.

This analysis consists for example of calculating the signal to noise ratio $SNR(F_{1,m})$ of each carrier frequency $F_{1,m}$ by:

$$SNR(F_{1,m}) = \frac{P_{1,m}|H_{1,m}|^2}{\sigma_{1,m}^2}$$

and comparing this signal to noise ratio with a value of this ratio previously calculated from the previously measured transmission characteristics.

According to another example, the master modem compares the transmission rate $R_1$ with a previously measured transmission rate.

When the transmission characteristics measured by a slave modem are degraded with respect to a previous measurement, for example when the measured transmission rate $R_1$ is less than a previously measured rate and/or when the signal to noise ratio $SNR(F_{1,m})$ is lower than a value of this ratio calculated from previously measured transmission characteristics, the master modem then considers each carrier frequency allocated or that may be allocated for coding the signal S and determines, for each of them, whether it is common with a carrier frequency $F_{1,m}$. If such is the case, this carrier frequency is denoted $F_{2,n}$.

According to one embodiment of the method, a carrier frequency $F_{1,m}$ and a carrier frequency $F_{2,n}$ are common when they are separated from each other by a distance less than a predetermined maximum distance, which may be either zero, that is to say the two carrier frequencies are equal to the same value, or strictly greater than zero, that is to say the two carrier frequencies have values that are different but close together.

Preferably, the distance is defined by the difference between the cardinal sine of the carrier frequency of the signal S weighted by a filter that limits the secondary lobes of the cardinal sine, and the cardinal sine of the carrier frequency of the signal Se weighted by a filter that limits the secondary lobes of the cardinal sine.

When at least one carrier frequency $F_{2,n}$ has been detected during step 2, step 2 continues with step 3 of optimising the distribution of the data of the signal Se on carrier frequencies so as to minimise the transmission power level of the carrier frequencies $F_{1,m}$ that are common with the carrier frequencies $F_{2,n}$ thus detected while optimising the transmission rate of the signal Se.

Two embodiments of step 3 are now presented: the first concerns the case where the network R is a DSL network and the second concerns the case where the network R is also an electrical network possibly distinct from the electrical network Re.

According to the first embodiment of step 3, implemented by the master modem, each carrier frequency $F_{1,m}$, the measured transmission characteristics of which are degraded with respect to those of a previous measurement and which is common with a carrier frequency $F_{2,n}$, is replaced by a new carrier frequency $F_{1,p}$ (p=1 to P), of the frequency band BF. It should be noted that P is less than or equal to M.

It is advantageous for each new carrier frequency to be chosen in a sub-band of the reserved frequency band BF in which no carrier frequency is allocated for coding the signal S.

For example, in the case where the network R is a DSL network, this sub-band extends from 30 to 100 mHz since this new carrier frequency will then not be common with any of the carrier frequencies allocated or that may be allocated to code the signal S, thus avoiding any interference between the signals Se and S.

The data of the signal Se that were up until then coded on the P carrier frequencies $F_{1,m}$ are then distributed over these new carrier frequencies $F_{1,p}$ so that the transmission rate $R^*$ of these new carrier frequencies is maximised subject to the maximum transmission power of each new carrier frequency $F_{1,p}$ complying with a specific spectral density profile $\overline{P_1}$, that is to say the distribution of the data is effected by solving the following equation:

$$R^* = \max_{P_{1,p}} \sum_{p=1}^{P} \log_2\left(1 + \frac{P_{1,p}|H_{1,p}|^2}{\sigma_{1,p}^2 + \alpha + \beta\sqrt{F_{1,p}}}\right) \quad (1)$$

subject to the constraint $$\sum_{p=1}^{P} P_{1,p} \leq \overline{P_1},$$

$$P_{1,p} \geq 0 \; \forall \; p$$

in which $P_{1,p}, |H_{1,p}|^2, \sigma_{1,p}^2$ are the measurements of the transmission characteristics of a carrier frequency $F_{1,p}$ carried out during step 1, and the expression $\alpha + \beta\sqrt{F_{1,p}}$ represents a modelling of the coupling between the electrical network Re and the network R. It should be noted that this coupling model depends on the carrier frequency, which reflects reality.

The pair of parameters ($\alpha$, $\beta$) is estimated by the minimisation by least squares of the measurements of the transmission characteristics of each carrier frequency F carried out during step 1.

In this case, the P carrier frequencies $F_{1,p}$ make it possible to code the data coded up until then on the P carrier frequencies $F_{1,m}$, that is to say the transmission rate of the signal Se after replacement of the carrier frequencies is equal to the transmission rate of the signal Se previously measured by a slave modem, and step 3 is terminated.

In the contrary case, that is to say if the transmission rate of the signal Se obtained at the end of the optimisation step is less than a previously measured transmission rate of this signal Se, at least one other carrier frequency $F_{1,c}$ (c=1 to C) is chosen in the sub-band complementary to the sub-band. In the case of a DSL network, this complementary sub-band extends from 1 to 30 mHz.

When more than one carrier frequency $F_{1,c}$ chosen in the complementary sub-band, these carrier frequencies are chosen so that a minimum distance separates them, in order to prevent any interference between them.

The data of the signal Se that have not been able to be coded on the carrier frequencies $F_{1,c}$ are then distributed over these carrier frequencies $F_{1,c}$ as to minimise the transmitted power level $P_{1,c}$ each carrier frequency $F_{1,c}$ to the measured transmission rate $R_1$ being reached, that is to say the data of the signal Se that have not yet been able to be coded are coded.

The data are distributed by solving the following equation:

$$P^* = \min_{P_{1,c}} \sum_{c=1}^{C} P_{1,c} \quad (2)$$

under the constraint $$\overline{R_1} = \sum_{c=1}^{C} \log_2\left(1 + \frac{P_{1,c}|H_{1,c}|^2}{\sigma_{1,c}^2 + \alpha + \beta\sqrt{F_{1,c}}}\right)$$

in which $P_{1,c}, |H_{1,c}|^2, \sigma_{1,c}^2$ are the measurements of the transmission characteristics of a carrier frequency $F_{1,c}$ during step 1, and $P^*$ designates the total minimum power level transmitted.

It should be noted that the number of carrier frequencies chosen in the complementary sub-band is chosen empirically so that all the data carried by the carrier frequencies $F_{1,m}$ are distributed over the carrier frequencies $F_{1,p}$ and $F_{1,c}$.

FIG. 2 shows an illustration of this first embodiment of the method.

The timing diagram at the top of FIG. 2 shows an example of distribution of the data of the signal Se over carrier frequencies $F_{1,m}$ numbered 6 to 17 of a sub-band of the reserved frequency band BF extending from frequency 1 to frequency 17.

Let it be assumed that, at the end of step 2, the master modem has detected two carrier frequencies $F_{2,1}$ and $F_{2,2}$ allocated or that may be allocated for coding the signal S that are common to the carrier frequencies 6 and 9 allocated for coding the signal Se. In addition let it be assumed that the measured transmission characteristics of these carrier frequencies 6 and 9 are degraded with respect to those of a previous measurement.

The timing diagram at the middle of FIG. 2 shows the result of the optimisation according to equation (1) in the case where the carrier frequencies 6 and 9 have been replaced by the carrier frequencies 14 and 15 of the sub-band defined here between the frequencies 6 and 17. It should be noted here that the frequencies 14 and 15 were already allocated for coding the signal Se. The data that they carry therefore form part of the data to be distributed.

It can be seen in this example that the data of the signal Se up until then carried on the carrier frequencies 6 and 9 (to which there are added the data carried by the frequencies 14 and 15) are distributed over the new carrier frequencies 14 and 15.

Let it be assumed now that all data carried up until then by the carrier frequencies 6 and 9 (to which there are added the data carried by the frequencies 14 and 15) have not been able to be distributed over the carrier frequencies 14 and 15.

Two other frequencies 1 and 3 are then chosen in a complementary sub-band defined here between the frequencies 1 to 5.

The timing diagram at the bottom shows the result of the optimisation according to equation (2). It can be seen that the data that had not yet been distributed over the frequencies 15 and 14 are distributed over these two carrier frequencies 1 and 3.

According to the second embodiment of step 3, the network R is an electrical network and the signal S is a signal of the carrier current type that is transmitted over this network R between modems. Step 3 is implemented by equipment that is accessible to each of these master modems.

According to this embodiment of step 3, the distribution of the data of the signal Se on the carrier frequencies $F_{1,m}$ is optimised so as to minimise the transmission power level of the carrier frequencies $F_{1,m}$ that are common with the carrier frequencies $F_{2,n}$ thus detected while optimising the transmission rate of the data of the signal Se. However, this optimisation is achieved in competition with the optimisation of the distribution of the data of the signal S on the carrier frequencies $F_{2,n}$ allocated, subject to the constraint of a specific spectral density profile $\overline{P}$.

FIG. 3 shows a diagram of an iterative algorithm that allows such a competitive optimisation of the distributions of the data of the signals Se and S on their carrier frequencies.

This algorithm is based on the one described by the article "An Adaptative Multiuser Power Control Algorithm for VDSL", W. Yu et al, GLOBECOM01, vol. 1, 2001, pages 394-398, in which the coupling between the electrical network Re, for example of the G.hn carrier current mode type, and the electrical network R, for example of the G.hn carrier current mode type, is modelled by the expression $\alpha + \beta\sqrt{f_{1,m}}$. The pair of parameters $(\alpha, \beta)$ is estimated by minimisation by least squares of the measurements of the transmission characteristics of each carrier frequency F made during step 1.

The principle of the algorithm consists of obtaining distributions of the data of the signals Se and S so as to achieve the measured transmission rates $R_1$ and $R_2$.

For this purpose, initially, the transmission power levels $P_{1,m}$ and $P_{2,n}$ are fixed at predetermined values. Next, during a first iterative step, commonly referred to as iterative water filling, the transmission power levels $P_{1,m}$ are minimised subject to the measured transmission rate $R_1$ being reached, that is to say by solving equation (3) in which the exponents * indicate that they are values reached by the optimisation:

$$P_1^* = \min_{P_{1,m}} \left( \sum_{m=1}^{M} P_{1,m} \right) \quad (3)$$

under the constraint $$R_1^* = \sum_{m=1}^{M} \log_2 \left( 1 + \frac{P_{1,m}|H_{1,m}|^2}{\sigma_{1,m}^2 + \alpha + \beta\sqrt{F_{1,m}}} \right)$$

in which $P_{1,m}, |H_{1,m}|^2, \sigma_{1,m}^2$ are the measurements of the transmission characteristics of a carrier frequency $F_{1,m}$ made during step 1.

Following the optimisation of equation (3), the transmission power levels $P_{2,n}$ are minimised subject to the measured transmission rate $R_2$ being reached, that is to say by solving equation (4) in which the exponents * indicate that they are values reached by the optimisation:

$$P_2^* = \min_{P_{2,n}} \left( \sum_{n=1}^{N} P_{2,n} \right) \quad (4)$$

under the constraint $$R_2^* = \sum_{n=1}^{N} \log_2 \left( 1 + \frac{P_{2,n}|H_{2,n}|^2}{\sigma_{2,n}^2 + \alpha + \beta\sqrt{F_{2,n}}} \right)$$

in which the transmission characteristics are measured by each slave modem in the network R, namely the spectral density level $P_{2,n}$ of this carrier frequency, the gain $|H_{2,n}|^2$ and the variance $\sigma_{2,n}^2$ of the complex transmission channel relating to this carrier frequency and the transmission rate $\overline{R}_2$ of the signal S.

Once equation (4) has been optimised, the optimisation of equation (3) is once again carried out, and then optimisation of equation (4) and so on as long as the transmission rate $R_1^*$ is estimated as being sufficiently close to (less than or greater than or equal to) the measured transmission rate $R_1$ and the transmission rate $R_2^*$ is estimated as being sufficiently close to the measured transmission rate $R_2$.

When these two conditions are satisfied, the first step is followed by a second step during which the transmission power levels $P_{1,m}$ and $P_{2,m}$ are updated in accordance with the following relationships:

$$\begin{cases} \text{if } R_1^* > R_1 + \varepsilon & \text{then } P_1^* = P_1^* - \delta \\ \text{if } R_1^* < R_1 & \text{then } P_1^* = P_1^* + \delta \\ \text{if } P_1^* > \overline{P}_1 & \text{then } P_1^* = \overline{P} \\ \text{if } R_2^* > R_2 + \varepsilon & \text{then } P_2^* = P_2^* - \delta \\ \text{if } R_2^* < R_2 & \text{then } P_2^* = P_2^* + \delta \\ \text{if } P_2^* > \overline{P}_2 & \text{then } P_2^* = \overline{P} \end{cases}$$

The second step is followed by the first step as long as the transmission rate $R_1^*$ is greater than the measured transmission rate $R_1$ or the transmission rate $R_2^*$ is greater than the measured transmission rate $R_2$.

The parameters $\delta$ and $\varepsilon$ are fixed empirically, for example at respective values of 3 dB and 10%.

FIG. 4 shows an illustration of two iterations of this algorithm for distributing the data of the signals Se and S competitively.

Each timing diagram shows the spectral transmission power densities of the signals Se and S according to the carrier frequencies of the reserved frequency band BF. The timing diagram at top left shows these densities $P_1$ and $P_2$ following the initialization of the transmission power levels $P_{1,m}$ and $P_{2,n}$. The timing diagram at top right shows these densities once the transmission power levels $P_{1,m}$ have been optimised in accordance with equation (3). It can be seen that the spectral density $P_1^*$ obtained is concentrated on carrier frequencies that are not allocated for coding the signal S or at the very least on carrier frequencies the transmission power levels $P_{2,n}$ of which are the lowest. The timing diagram at bottom right shows these densities once the transmission power levels $P_{2,n}$ have been optimised according to equation (4). The same phenomenon can be seen, namely that the spectral density $P_2^*$ obtained is concentrated on carrier frequencies that are not allocated for coding the signal Se or at the very least to carrier frequencies the transmission power levels $P_{1,m}$ of which are the lowest.

Thus, at each iteration of the first step of the algorithm, the spectral transmission power densities are distinguished from one another, thus preventing interference between the signals Se and S.

The timing diagram at bottom right shows the spectral transmission power densities once the transmission power levels $P_{1,m}$ have once again been optimised according to equation (3) during a second iteration of the first step of the algorithm. It can be seen that the spectral transmission power density $P_1^*$ is spread over a larger number of carrier frequencies because transmission power levels $P_{2,n}$ the carrier frequencies $F_{1,m}$ of which are close to the carrier frequencies $F_{2,n}$ are lower values than at the previous iteration.

Thus, after a few iterations of the algorithm, the spectral power densities are distinguished from one another and are spread over the entire reserved frequency band.

According to one feature of the invention, the steps of the method are repeated periodically.

Preferably, the repetition period T is synchronised on the frequency of the alternating electric current delivered by an electrical network Re or R. For example, when an operating cycle, MAC mode, of the modems $M_{CPL}$ is synchronised on the frequency F, the period T begins after a length of time Δ that begins as from each zero crossing of the electrical signal Se.

In this case, the modem $M_{CPL}$ is designed to detect the zero crossing of the electrical signal Se, which then enables it to launch the execution of the steps of the method after the length of time Δ which may also be zero.

According to one of the hardware aspects thereof, the present invention concerns a device for reducing interference between a first signal of the carrier current type transmitted between modems in an electrical network and a second signal transmitted between modems in another network.

This device comprises means for implementing an interference reduction method described above.

FIG. 5 shows an embodiment of this device in the case of an electrical network comprising at least one slave modem and one master modem $M_{CPLM}$.

According to this mode, the device is partially implemented by a master modem and by each slave modem $M_{CPLE}$.

Each slave modem $M_{CPLE}$ is a conventional carrier current modem, that is to say it is designed to transmit to another modem the signal Se the data of which are distributed over carrier frequencies. In addition, each slave modem $M_{CPLE}$ comprises means MM for measuring transmission characteristics of each carrier frequency allocated for coding the signal Se or which may be so allocated. According to the present invention, the slave modem $M_{CPLE}$ comprises means MT for transmitting the measured transmission characteristics to the master modem $M_{CPLM}$.

The master modem $M_{CPLM}$ is designed to manage the distribution of the carrier frequencies. According to the present invention, it comprises means MR for receiving transmission characteristics of each carrier frequency that may be used, measured by each slave modem $M_{CPLE}$, means MD for detecting, by analysing said measured transmission characteristics, at least one carrier frequency $F_{2,n}$ that is allocated or may be allocated for coding a second signal S transmitted between modems in another network R, and which is common with at least one carrier frequency $F_{1,m}$ that is allocated for coding the signal Se and the measured transmission characteristics of which are degraded with respect to those of a previous measurement. The master modem $M_{CPLM}$ also comprises means MO for optimising the distribution of the data of the signal Se over carrier frequencies so as to minimise the transmission power level of the first carrier frequencies $F_{1,m}$ that are common with the carrier frequencies $F_{2,n}$ thus detected, while optimising the transmission rate of the first signal Se.

According to one embodiment implemented, the means MM, MD, MO are implemented by a set of programmable electronic components using in particular a memory and the means MT are electronic components that communicate with conventional means of communicating data between modems in an electrical network.

The invention claimed is:

1. Method of reducing interference between a first signal of the carrier current type (Se) transmitted between modems ($M_{CPL}$) in an electrical network (Re) and a second signal (S) transmitted between modems (M) in another network (R), the said signals (Se, S) being coded by the distribution of data over allocated carrier frequencies in the same reserved frequency band (BF), the method comprising
a step (1) of measurement, by each modem ($M_{CPL}$) in the electrical network, of transmission characteristics of each carrier frequency (F) that may be used for coding the first signal (Se), and
a step (3) of optimisation of the distribution of the data of the first signal (Se) on carrier frequencies so as to minimise the transmission power level of carrier frequencies subject to the constraint of a transmission rate of the first signal (Se), characterised in that it comprises
a step (2) of detection, by analysing the measured transmission characteristics, of at least one carrier frequency ($F_{2,n}$), referred to as the second carrier frequency, that is allocated or may be allocated for coding the second signal (S) and is common with at least one carrier frequency ($F_{1,m}$), referred to as the first carrier frequency, that is allocated for coding the first signal (Se), and the measured transmission characteristics of which are degraded with respect to those of a previous measurement, and
optimisation of the distribution of the data of the first signal (Se) subject to the constraint of a transmission rate of the first signal (Se) is carried out so as to minimise the transmission power level of the first carrier frequencies ($F_{1,m}$) that are common with the second carrier frequencies ($F_{2,n}$) thus detected.

2. Method according to claim 1, in which the transmission characteristics measured on a carrier frequency (F) are the spectral density level (P) of this carrier frequency, the gain ($|H|^2$) and the variance ($\sigma^2$) of the complex transmission channel relating to this carrier frequency and the transmission rate ($R_1$) of the first signal (Se).

3. Method according to claim 1, in which a first carrier frequency ($F_{1,m}$) is common to a second carrier frequency ($F_{2,n}$) when they are separated from each other by a distance less than a predetermined maximum distance (D).

4. Method according to claim 3, in which the maximum distance (D) is either zero, strictly greater than zero, or greater than or equal to zero.

5. Method according to claim 1, in which, during the optimisation step (3), each first carrier frequency ($F_{1,m}$), the measured transmission characteristics of which are degraded with respect to those of a previous measurement and which is common with a second carrier frequency ($F_{2,n}$), is replaced by a new carrier frequency ($F_{1,p}$) of the reserved frequency band BF, and the data of the first signal (Se), which were until then coded on said first carrier frequencies, are then distributed on these new carrier frequencies ($F_{1,p}$) so that the transmission rate (R*) of these new carrier frequencies is maximised subject to the maximum transmission power of each new carrier frequency ($F_{1,p}$) complying with a specific spectral density profile ($\bar{P}_1$).

6. Method according to claim 5, in which each new carrier frequency ($F_{1,p}$) is chosen in a sub-band of the reserved frequency band in which no carrier frequency is allocated for coding the second signal (S).

7. Method according to claim 6, in which, if the transmission rate of the first signal (Se) obtained at the end of the optimisation step is less than a measured transmission rate of this signal, at least one other carrier frequency ($F_{1,c}$) is selected in the sub-band complementary to said sub-band.

8. Method according to claim 7, in which the carrier frequencies are chosen in the complementary sub-band so that a minimum distance separates them.

9. Method according to claim 8, in which the data of the first signal (Se) that have not been able to be coded on said new carrier frequencies ($F_{1,p}$) are then distributed over these carrier frequencies ($F_{1,c}$) of the complementary sub-band so as to minimise the transmission power level ($P_{1,c}$) of each carrier frequency ($F_{1,c}$) of the complementary sub-band subject to a measured transmission rate of the first signal (Se) being reached.

10. Method according to claim 1, in which, during the optimisation step, the distribution of the data of the first signal (Se) over the first carrier frequencies ($F_{1,m}$) is optimised so as to minimise the transmission power level of the first carrier frequencies ($F_{1,m}$) that are common with the second carrier frequencies ($F_{2,n}$) thus detected while optimising the transmission rate of the data of the first signal (Se) and, competitively, the distribution of the data of the second signal (S) over the said second carrier frequencies ($F_{2,n}$) is optimised so as to minimise the transmission power level of the said second carrier frequencies ($F_{2,n}$) while optimising the transmission rate of the data of the second signal (S), and this subject to the constraint of a specific spectral density profile ($\overline{P}$).

11. Method according to claim 1, in which the measurement, detection and optimisation steps are repeated periodically.

12. Method according to claim 11, in which the repetition of the said steps is synchronised on the frequency of the electric current of an electrical network.

13. Device for reducing interference between a first signal of the carrier current type (Se) transmitted between modems ($M_{CPLE}$) in an electrical network (Re) and a second signal (S) transmitted between modems (M) in another network (R), the said signals (Se, S) being coded by distribution of the data on allocated carrier frequencies of the same reserved frequency band, the said device comprising means (MM) so that each modem ($M_{CPL}$) in the electrical network measures transmission characteristics of each carrier frequency (F) allocated for coding the first signal (Se) or that may be so allocated, and means (MO) for optimising the distribution of the data of the first signal (Se) over carrier frequencies so as to minimise the transmission power level of carrier frequencies subject to the constraint of a transmission rate of the first signal (Se), characterised in that it also comprises means (MD) for detecting, by analysing the measured transmission characteristics, at least one carrier frequency ($F_{2,n}$), referred to as the second carrier frequency, which is allocated or may be allocated for coding the second signal (S) and is common with at least one carrier frequency ($F_{1,m}$), referred to as the first carrier frequency, which is allocated for coding the first signal (Se) and the measured transmission characteristics of which are degraded with respect to the those of a previous measurement, and in that the means (MO) for optimising the distribution of the data of the first signal (Se) subject to the constraint of a transmission rate of the first signal (Se) are provided for minimising the transmission power level of the first carrier frequencies ($F_{1,m}$) that are common with the second carrier frequencies ($F_{2,n}$) thus detected.

14. Modem, referred to as the master modem, provided for managing the distribution of carrier frequencies, referred to as first carrier frequencies, of a first signal of the carrier current type (Se) transmitted over an electrical network, the said modem comprising means (MR) for receiving transmission characteristics of each carrier frequency that may used measured by each other modem in the electrical network, and means (MO) for optimising the distribution of the data of the first signal (Se) over carrier frequencies so as to minimise the transmission power level of carrier frequencies subject to the constraint of a transmission rate of the first signal (Se), characterised in that it also comprises means (MD) for detecting, by analysing the said measured transmission characteristics, at least one carrier frequency ($F_{2,n}$), referred to as the second carrier frequency, which is allocated or may be allocated for coding a second signal (S) transmitted between modems in another network, and is common with at least one carrier frequency ($F_{1,m}$), referred to as the first carrier frequency, which is allocated for coding the first signal (Se) and the measured transmission characteristics of which are degraded with respect to the those of a previous measurement, and in that the means (MO) for optimising the distribution of the data of the first signal (Se) subject to the constraint of a transmission rate of the first signal (Se) are provided for minimising the transmission power level of the first carrier frequencies ($F_{1,m}$) that are common with the second carrier frequencies ($F_{2,n}$) thus detected.

15. System for transmitting a signal of the carrier current type between modems in an electrical network, characterised in that at least one modem is in accordance with claim 14.

* * * * *